Patented Apr. 28, 1953

2,636,870

UNITED STATES PATENT OFFICE 2,636,870

AQUEOUS SYNTHETIC RESIN DISPERSION FOR THE PRODUCTION OF NONTACKY AND NONBLOCKING FILMS AND COATINGS

Harry E. Connors, Fairview Park, Ohio, and Arch L. Hatfield, Park Forest, Ill., assignors to The B. F. Goodrich Company, New York, N. Y., a corporation of New York No Drawing. Application March 31, 1951, Serial No. 218,706

5 Claims. (Cl. 260—29.6)

This invention relates to the production of aqueous dispersions of synthetic resins useful in forming non-tacky and non-blocking films and coatings. The invention pertains more particularly to the production, from monomeric vinylidene chloride, vinyl chloride, alkyl acrylates such as ethyl acrylate, and alkyl alkacrylates such as methyl methacrylate, of aqueous polymeric dispersions having new and unique properties, especially in regard to their ability to form films and coatings by air-drying at moderate temperatures, which films and coatings are plastic in nature yet are impermeable to moisture, greases and oils, and are not tacky at ordinary temperatures and do not block at elevated temperatures.

Two component or dual-copolymers of vinyl and vinylidene chloride with each other or of either of these with an alkyl acrylate or methacrylate are all well known materials. While such copolymers are inherently more thermoplastic than polyvinyl or polyvinylidene chloride, they ordinarily require the addition of plasticizers in order to form films and sheets thereof and to render them sufficiently flexible and plastic to be easily subjected, at moderately elevated temperatures, to processing operations such as molding, calendering, extruding and the like. Moreover, such copolymers, even when plasticized and cast from an aqueous dispersion or a solution in a volatile organic solvent in the form of films and coatings, require a heat treatment at elevated temperatures to effect a fluxing of the plasticized resin particles into a continuous film. In addition, when such plasticized copolymers are cast in the form of films and coatings and heat-treated or fluxed, the final cooled film or coating remains in a tacky condition so that sticking occurs when other materials are placed in contact therewith or when a plurality of films or coatings are placed in contact one with the other. Such films and coatings are also somewhat permeable to water and are attacked by various fats and greases so that they are less valuable for some uses, such as food packaging, than is desired.

In the copending application of Edward B. Osborne, Serial No. 772,002, filed August 27, 1947, there is disclosed a tripolymer latex made by polymerization in aqueous emulsion of a monomeric mixture consisting of from 75 to 90% by weight of vinylidene chloride, 5 to 15% by weight of vinyl chloride, and from 5 to 15% by weight of an alkyl acrylate. This latex is useful without the addition of plasticizers for forming soft and plastic films and coatings by air-drying at temperatures from room temperature up to 50° C. The films and coatings thus produced, while quite satisfactory for some purposes, have been found to possess properties which seriously limit their use in certain other applications. For example, a film or coating deposited from the latex is often tacky at ordinary temperatures so that foreign matter sticks to the coating, or, even though the film or coating may not be tacky to the touch at normal temperatures, it may become quite tacky when heated to temperatures of from 75 to 150° F. The latter property, known as "blocking," is especially undesirable in paper coating applications where the coated paper products of necessity have to be nested one within the other or otherwise placed in contact during shipment and distribution. A still further often undesirable property of certain of the vinylidene chloride, vinyl chloride, alkyl acrylate tripolymers, especially those containing from 85 to 90% by weight of vinylidene chloride (which are the least tacky in nature), is their tendency to become crystalline and stiff upon aging.

Accordingly, it is one of the principal objects of this invention to provide aqueous dispersions of polymeric materials containing no added plasticizer which are superior to those of the above-mentioned tripolymers in that they form films and coatings which are non-tacky at ordinary temperatures and non-blocking at elevated temperatures. Another object is the provision of an aqueous dispersion of thermoplastic polymeric material useful in coating and packaging which possesses outstanding impermeability to water and improved resistance to oils and greases and the like. Still other objects are to provide a stable synthetic resin latex which is useful for the production by air-drying at moderate temperatures of films and coatings which are strong, flexible, and tack-free. Still other objects will be apparent from the description of the invention which follows.

We have found that aqueous synthetic resin dispersions, highly useful in forming non-tacky and non-blocking films and coatings, are produced by incorporating an interpolymerized alkyl ester of an alpha-alkyl acrylic acid, such as methyl methacrylate, in an aqueous dispersion of an interpolymer (hereinafter referred to as the basic tripolymer latex) resulting from the polymerization in aqueous emulsion of a monomeric mixture comprising from 75 to 90% by weight of vinylidene chloride, 5 to 15% by weight of vinyl chloride, and from 5 to 15% by weight of an alkyl acrylate. The incorporation in the basic tripolymer latex of the interpolymerized alkyl alkacrylate may be accomplished in several ways provided that the finished latex contains as the dispersed phase an interpolymer, or mixture of interpolymers, in which the relative proportions of interpolymerized vinylidene chloride, vinyl chloride and alkyl acrylate remain the same as in the basic tripolymer latex and the proportion of interpolymerized alkyl alkacrylate is from 0.5 to 7.5% by weight based on the weight of the basic tripolymer.

One convenient method of incorporating interpolymerized alkyl alkacrylate consists in adding an aqueous disperson of a vinylidene chloride alkyl alkacrylate interpolymer (hereinafter referred to as the blending latex) made by polymerizing in aqueous emulsion a monomeric mixture containing at least two essential ingredients, one being from 85 to 95% by weight of vinylidene chloride and the other from 5 to 15% by weight of an alkyl alkacrylate. In addition to the two essential monomers utilized in the production of the blending latex, minor proportions of vinyl chloride may be substituted for up to one-half of the alkyl alkacrylate so as to produce a three-component interpolymer or tripolymer blending latex, in which case the monomeric mixture will consist of from 85 to 95% by weight of vinylidene chloride, 2 to 7.5% by weight of vinyl chloride and from 2 to 7.5% by weight of alkyl alkacrylate. The utilization of such a tripolymer blending latex is greatly preferred since the resulting aqueous dispersion produces films and coatings having lower fusion temperatures, greater softness and pliability combined with good blocking characteristics. When a two-component interpolymer or copolymer blending latex is utilized the proportions of latices blended, on the dry solids basis, should preferably be between the weight ratios of 2:1 and 1:2 of the basic tripolymer latex and blending copolymer latex, respectively. The use of a tripolymer blending latex permits slightly greater latitude in the proportions of each latex utilized, the blending ratio in this case preferably varying from 3:1 to 1:3.

Another method of incorporating the interpolymerized alkyl alkacrylate is to interpolymerize the latter with the monomeric vinylidene chloride, vinyl chloride and alkyl acrylate in the preparation of the basic tripolymer latex. In the latter case a true tetrapolymer latex is believed to result from the interpolymerization in aqueous emulsion of a monomeric mixture consisting of from 75 to 89% by weight of vinylidene chloride, from 5 to 15% by weight of vinyl chloride, from 5 to 10% of alkyl acrylate and from 1.0 to 7.5% by weight of alkyl alkacrylate. Any of these methods result in aqueous polymeric dispersions from which films and coatings may be produced which are soft and flexible and yet are non-tacky and non-blocking in nature and do not become crystalline and stiff upon aging.

Any of the alkyl esters of acrylic acid may be employed in the preparation of the basic tripolymer latex. For example, methyl acrylate, ethyl acrylate, n-propyl acrylate, isopropyl acrylate, n-butyl acrylate, isobutyl acrylate, n-amyl acrylate, 2-ethylhexyl acrylate, 3,5,5-trimethylhexyl acrylate, n-decyl acrylate, lauryl acrylate, n-octadecyl acrylate, and others may be used. It is preferred, however, to employ those alkyl acrylates which contain less than eight carbon atoms in the molecule. Methyl and ethyl acrylate produce the best interpolymers for the purposes of this invention.

Any of the alkyl esters of alpha-alkyl acrylic acids may also be employed for producing interpolymerized alkyl alkacrylate to be incorporated with the basic latex. Thus, such alkyl alkacrylates as methyl methacrylate, ethyl methacrylate, propyl methacrylate, n-butyl methacrylate, methyl ethacrylate, ethyl ethacrylate and others may be used. Methyl methacrylate because of its ready availability, low cost and its ability to form interpolymers of greatly superior blocking properties is the alkyl alkacrylate to be greatly preferred.

In the practice of this invention particularly valuable basic tripolymer film-forming latices are those prepared from monomeric mixtures consisting of vinylidene chloride, vinyl chloride and ethyl acrylate in the ratios by weight: 77:11.5:11.5, 80:10:10 and 85:5:10. Particularly valuable as blending latices are the latices resulting from monomeric mixtures consisting of vinylidene chloride, vinyl chloride and methyl methacrylate in the ratios: 90:5:5 and 88:7:5 and the latex resulting from a monomer mixture consisting of vinylidene chloride and methyl methacrylate in the ratio of 90:10.

The aqueous dispersions of polymeric latices utilized in preparing the film-forming aqueous dispersion of this invention may be prepared by any of the conventional emulsion polymerization techniques employing an efficient emulsifying agent to obtain a stable final product. There may be used as an emulsifier the ordinary soaps such as the alkali metal, ammonium and alkanol amine salts of fatty acids including sodium oleate, potassium palmitate, ammonium stearate, ethanol amine laurate, and the like as well as rosin and dehydrogenated rosin acid soaps, and the synthetic saponaceous materials including the hymolal sulfates and sulfonates such as sodium lauryl sulfate, sodium cetyl sulfate, the sodium salts of sulfonated paraffin oils, the sodium salts of dodecane-1-sulfonic acid, octadecane-1-sulfonic acid, etc., the alkaryl sulfonates such as the sodium alkyl aryl sulfonates such as sodium isopropyl benzene sulfonate, sodium isopropyl naphthalene sulfonate, the alkali metal salts of sulfonated dicarboxylic acid esters and amides such as sodium dioctyl sulfosuccinate, sodium N-octadecyl-sulfonsuccinamate, and the like and salts of organic bases containing long carbon chains such as the hydrochloride of diethylaminoethyloleylamide, lauryl amine hydrochloride, trimethyl cetyl ammonium bromide, and the like.

While the polymerization reaction to form any of the polymeric latices for use in this invention may be carried out in the presence of air, the rate of reaction is ordinarily faster in the absence of gaseous oxygen and hence polymerization in an atmosphere of monomer or inert gas is preferred. The temperature at which the polymerization is carried out is not critical, it may be varied widely from 0° C. up to 100° C. or higher, though best results are generally obtained at a temperature from about 20 to 70° C.

Any of the catalysts commonly employed for the polymerization of vinyl and vinylidene compounds may be used in preparing the polymeric latices. Actinic radiation may be employed, as well as the various peroxygen compounds such as hydrogen peroxide, potassium persulfate, benzoyl peroxide, o,o'-dichlorobenzoyl peroxide, caprylyl peroxide, sodium perborate, sodium percarbonate, and the like. A preferred catalyst for use in this invention is potassium persulfate. Buffers such as sodium carbonate, disodium phosphate, ammonium hydroxide, and others may be utilized to maintain the desired pH during the reaction.

The following specific examples describe the invention in greater detail, particularly with regard to the preparation of specific preferred polymer latices, their blending and the properties of films and coatings which are prepared therefrom. The examples are intended merely as illustrations of the nature of our invention and not as limitations on the scope thereof.

*Example 1*

A tripolymer latex was produced by the polymerization at 50° C. of the monomeric materials contained in a reaction mixture containing the following ingredients.

| Material: | Parts/wt. |
|---|---|
| Vinylidene chloride | 77.00 |
| Vinyl chloride | 11.50 |
| Ethyl acrylate | 11.50 |
| Emulsifier [1] | 3.00 |
| Disodium phosphate | 0.70 |
| Trisodium phosphate | 0.30 |
| Potassium persulfate | 0.70 |
| Latex seed | 8.00 |
| Water, soft | 95.00 |

[1] A sulfonated paraffin oil known as "Duponol MP 189S."

The product is a stable polymer latex of approximately 50% total solids content.

A second tripolymer latex is prepared by the polymerization at 50° C. of the monomeric materials contained in a reaction mixture having the following composition.

| Material: | Parts/wt. |
|---|---|
| Vinylidene chloride | 90.0 |
| Vinyl chloride | 5.0 |
| Methyl methacrylate | 5.0 |
| Emulsifier [1] | 3.0 |
| Disodium phosphate | 0.6 |
| Potassium persulfate | 0.6 |
| Latex seed | 4.0 |
| Water | 95.0 |

[1] Same as above.

The product likewise is a stable polymeric latex containing about 50% total solids.

The two tripolymer latices are blended in 50:50 proportions simply by stirring the two together. The blended dispersion is as stable as either of the component latices and needs only the addition of about 1% of carboxymethyl or hydroxyethyl cellulose, polyacrylic acid or polyacrylamide thickening agents to be suitable for film casting or coating applications. A film 4 mils in thickness deposited from the blended latex and dried at room temperature (30° C.) has a tensile strength of 2700 lbs./sq. in., an elongation of 110%, and a Graves tear strength of 600 lbs./in. The film when fused at 225° F. has a tensile strength of 3200 lbs./sq. in., an elongation of 110% and a Graves tear strength of 750 lbs./in. A sheet of 50 lb. super calendered kraft paper coated with polymer from the latex blend to a thickness of 1 mil has a moisture vapor transmission (M. V. T.) of only 0.6 gm./100 sq. in./24 hours and, in addition, has very good grease resistance. The coating is clear and glossy, is tightly adherent to the paper base, is very dry to the touch, does not stiffen upon aging at 100° F. for as much as 3 months, and has unusually good blocking characteristics as shown by a test in which a weight of 1 lb./sq. in. is placed on top of two sheets of film in face-to-face relationship and heated at a temperature of 120° F. for 16 hours. Under this test the two sheets of film in each case fell apart of their own weight when the weight was removed. Similar films formed from the unblended basic polymer latex are so tightly adherent when subjected to this test as to require the exertion of considerable force in order to be separated. Paper and boxboard coated with the blended latex are ideal packaging materials because they are flexible, resistant to the transmission of moisture vapor and grease, are not tacky to the touch, do not stick to like-coated surfaces, and may be heat-sealed when one coated surface is in contact with another. Cap liners, soap cartons, frozen food cartons and wrappers, and ice cream and milk cartons are but a few of the types of food packages which can be made from unsupported films or coated papers prepared from the blended latex of this example.

Similar results are obtained by blending from as much as 75% by weight of the basic tripolymer latex and 25% of the blending latex to as little as 25% of the basic latex and 75% of the blending latex. A tripolymer latex made from monomeric mixtures consisting of 80% vinylidene chloride, 10% vinyl chloride and 10% ethyl acrylate blended with similar proportions of a latex resulting from a monomeric mixture of 85% vinylidene chloride, 7.5% vinyl chloride and 7.5% methyl methacrylate produces a blended aqueous dispersion useful in the production of flexible but tough, non-tacky and non-blocking films and coatings.

*Example 2*

A copolymer latex is prepared by polymerizing at 50° C. the monomeric materials contained in a reaction mixture having the following composition.

| Material: | Parts/wt. |
|---|---|
| Vinylidene chloride | 90.0 |
| Methyl methacrylate | 10.0 |
| Disodium phosphate | 0.6 |
| Potassium persulfate | 0.6 |
| Emulsifier [1] | 3.0 |
| Latex seed | 6.0 |
| Water | 95.0 |

[1] Same as in Example 1.

The product is a stable white latex containing about 50% total solids.

The copolymer latex is blended with a 77:11.5:11.5 vinylidene chloride, vinyl chloride and ethyl acrylate latex similar to that of Example 1 in the weight ratio of 1:2. The resulting latex blend thickened with 1% by weight based on the latex solids basis of carboxymethyl cellulose is used to cast a 4 mil unsupported film and a 1 mil coating on paper boxboard each being dried at 50° C. in air. The resulting film and coating is smooth, glossy and dry to the touch at ordinary temperatures, has good blocking characteristics, and does not stiffen appreciably in service. The film and coating are slightly harder and less thermoplastic than those of Example 1.

Example 3

A stable polymeric dispersion is obtained by polymerizing at 50° C. the monomeric materials contained in a reaction mixture having the following composition.

| Material: | Parts/wt. |
| --- | --- |
| Vinylidene chloride | 77.0 |
| Vinyl chloride | 11.5 |
| Ethyl acrylate | 7.0 |
| Methyl methacrylate | 4.5 |
| Potassium persulfate | 0.6 |
| Disodium phosphate | 0.6 |
| Emulsifier [1] | 3.0 |
| Latex seed | 4.0 |
| Water | 95.0 |

[1] Same as in previous examples.

At the end of 16 hours the reaction is substantially complete with the production of a stable white latex containing over 50% total solids.

The resulting tetrapolymer latex is thickened by the addition of about 0.2 part of hydroxymethyl cellulose per 100 parts by weight of latex solids and cast on glass plates so as to form a dried film about 4 mils in thickness. The film is dried at 35° C. and then stripped from the glass plates and found to be soft, flexible and transparent. The film is found to have a tensile strength of 3,000 lbs./sq. in. and an elongation at break of 200%. After aging for 20 days at 70° C. the film is found to be soft and flexible and to have a tensile strength of 4100 lbs./sq. in. and an elongation of 225%. A sample of film similarly prepared from the latex of this example by air-drying at 50° C. has an initial tensile strength of 3700 lbs./sq. in. and an elongation of 200%. Thus the tetrapolymer latex has the property of forming excellent strong films by air-drying at moderate temperatures. Such films can not be formed from vinylidene chloride vinyl chloride copolymer latices, or from vinylidene chloride ethyl acrylate latices, or from vinylidene chloride methyl methacrylate copolymer latices, even when substantial amounts of liquid plasticizers are added.

The latex of Example 3 has other desirable properties including an M. V. T. of 0.6 gm./100 sq. in. in 24 hours, excellent grease resistance at temperatures as low as −40° F., and excellent blocking characteristics so that at temperatures as high as 120° F. no sticking together of films or coated boxboard sheets is observed. The properties of the tetrapolymer latex make it ideal for use in the paper-coating industry where resin-coated packaging materials are frequently stored or shipped in the "knocked-down" condition.

Similar results are obtained from latices made by polymerizing in aqueous emulsion of monomeric mixtures containing, respectively, 78.5% vinylidene chloride, 10% by weight of vinyl chloride, 7.0% of ethyl acrylate, and 4.5% methyl methacrylate; 77% vinylidene chloride, 12% vinyl chloride, 6.5% methyl acrylate, and 4.5% methyl methacrylate; and 85% vinylidene chloride, 5% vinyl chloride, 7.5% ethyl acrylate, and 2.5% ethyl ethacrylate.

Other polymeric dispersions similar to those described in Examples 1 to 3 are obtained with other alkyl esters of acrylic acid and with other alkyl esters of alkacrylic acids. Other polymerization conditions, catalysts, emulsifiers and the like are utilizable with equivalent results. Plasticizers, stabilizers, fillers, coloring pigments, lubricants and other substances may be incorporated in the aqueous dispersion, if desired, in the manner well understood in the art.

While we have disclosed with considerable detail certain preferred manners of performing the invention, it is not intended or desired to be limited solely thereto, for as hitherto stated, the procedure may be modified, the precise proportions of the materials utilized may be varied, and other materials having equivalent properties may be employed, if desired, without departing from the spirit and scope of the invention as defined in the appended claims.

We claim:

1. An aqueous dispersion of synthetic resin useful in forming non-tacky and non-blocking films and coatings under moderate fusion temperatures, said dispersion containing as the disperse phase a mixture of polymeric materials comprising (1) a tripolymer resulting from the polymerization in aqueous emulsion of a mixture of monomeric materials consisting of from 75 to 90% by weight of vinylidene chloride, from 5 to 15% by weight of vinyl chloride, and from 5 to 15% by weight of an alkyl acrylate and (2) a vinylidene chloride alkyl alkacrylate interpolymer selected from the class consisting of (a) a two-component interpolymer made by polymerizing in aqueous emulsion a monomeric mixture consisting of from 85 to 95% vinylidene chloride and from 5 to 15% by weight of an alkyl alkacrylate and (b) a three-component interpolymer made by polymerizing in aqueous emulsion a monomeric mixture consisting of 85 to 95% vinylidene chloride, 2 to 7.5% by weight of vinyl chloride and 2 to 7.5% by weight of an alkyl alkacrylate, the said mixture of polymeric materials containing from 33⅓ to 66⅔% by weight of tripolymer (1) and from 33⅓ to 66⅔% by weight of interpolymer (2), when said interpolymer is said two-component interpolymer (a), and from 25 to 75% by weight of tripolymer (1) and from 25 to 75% by weight of interpolymer (2), when said interpolymer is said three-component interpolymer (b).

2. An aqueous dispersion of synthetic resin useful in forming non-tacky and non-blocking films and coatings under moderate fusion temperatures, said dispersion containing as the disperse phase a mixture of polymeric substances comprising (1) a tripolymer resulting from the polymerization in aqueous emulsion a mixture of monomeric materials consisting of from 75 to 90% by weight of vinylidene chloride, from 5 to 15% by weight of vinyl chloride and from 5 to 15% by weight of an alkyl acrylate and (2) a tripolymer resulting from the polymerization of a monomeric mixture consisting of from 85 to 95% by weight of vinylidene chloride, from 2 to 7.5% by weight of vinyl chloride, and from 2 to 7.5% by weight of methyl methacrylate, the said mixture of polymeric substances containing from 25 to 75% by weight of tripolymer (1) and from 25 to 75% by weight of tripolymer (2).

3. An aqueous dispersion of synthetic resin useful in forming non-tacky and non-blocking films and coatings under moderate fusion temperatures, said dispersion containing as the disperse phase a mixture of polymeric substances comprising (1) a tripolymer resulting from the polymerization in aqueous emulsion a mixture of monomeric materials consisting of from 75 to 90% by weight of vinylidene chloride, from 5 to 15% by weight of vinyl chloride, and from 5 to 15% by weight of an alkyl acrylate and (2) a copolymer resulting from the polymerization in aqueous emulsion of a monomeric mixture consisting of from 85 to 95% by weight of vinylidene chloride and from 5 to 15% by weight of methyl methacrylate, said mixture of polymeric substances containing from 33⅓ to 66⅔% by weight of tripolymer (1) and from 33⅓ to 66⅔% by weight of copolymer (2).

4. An aqueous dispersion of synthetic resin useful in forming non-tacky and non-blocking films and coatings under moderate fusion temperatures, said dispersion containing as the disperse phase a mixture of polymeric substances comprising (1) a tripolymer resulting from the polymerization in aqueous emulsion of a monomeric mixture comprising from 75 to 90% by weight of vinylidene chloride, from 5 to 15% by weight of vinyl chloride, and from 5 to 15% by weight of ethyl acrylate and (2) a tripolymer resulting from the polymerization of a monomeric mixture consisting of from 85 to 95% by weight of vinylidene chloride, from 2 to 7.5% by weight of vinyl chloride, and from 2 to 7.5% by weight of methyl methacrylate, said mixture of polymeric substances containing from 25 to 75% by weight of tripolymer (1) and from 25 to 75% by weight of tripolymer (2).

5. An aqueous dispersion of synthetic resin useful in forming non-tacky and non-blocking films and coatings under moderate fusion temperatures, said dispersion containing as the disperse phase a mixture of polymeric substances comprising (1) a tripolymer resulting from the polymerization in aqueous emulsion a mixture of monomeric materials consisting of from 75 to 90% by weight of vinylidene chloride, from 5 to 15% by weight of vinyl chloride, and from 5 to 15% by weight of ethyl acrylate and (2) a copolymer resulting from the polymerization in aqueous emulsion of a monomeric mixture consisting of from 85 to 95% by weight of vinylidene chloride and from 5 to 15% by weight of methyl methacrylate, said mixture of polymeric materials containing from 33⅓ to 66⅔% by weight of tripolymer (1) and from 33⅓ to 66⅔% by weight of copolymer (2).

HARRY E. CONNORS.
ARCH L. HATFIELD.

References Cited in the file of this patent

FOREIGN PATENTS

| Number | Country | Date |
|---|---|---|
| 605,517 | Great Britain | July 26, 1948 |